March 5, 1935.     M. FRIEDLAND     1,993,135
INVERSE CAM
Filed Feb. 27, 1934
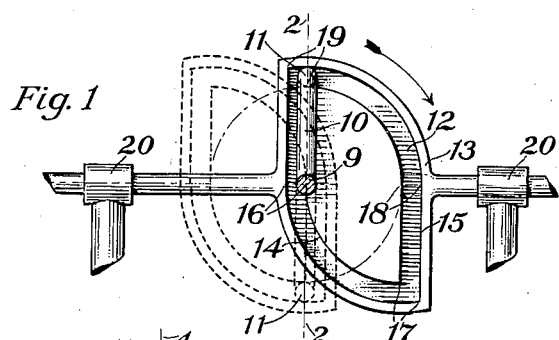
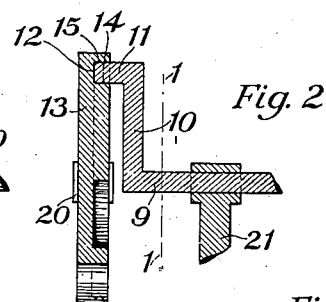
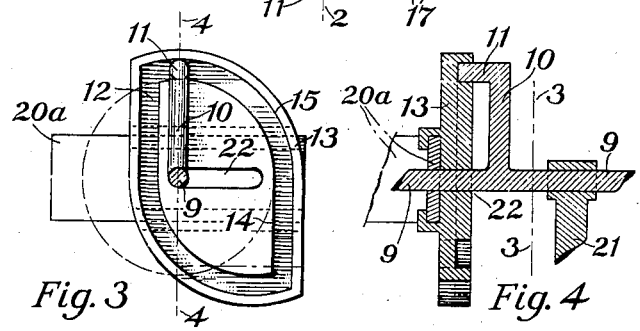
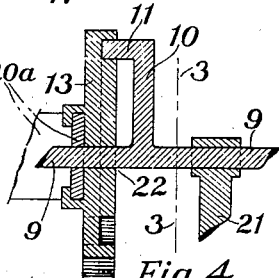
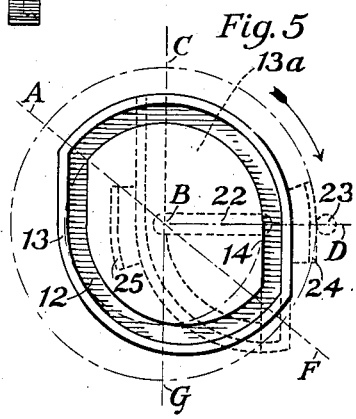
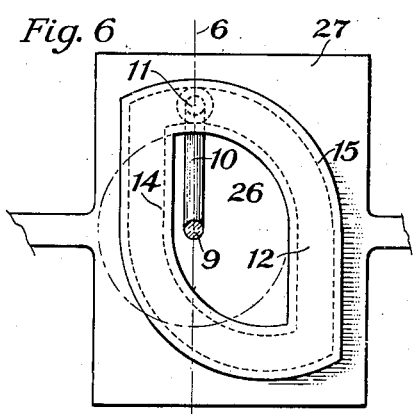
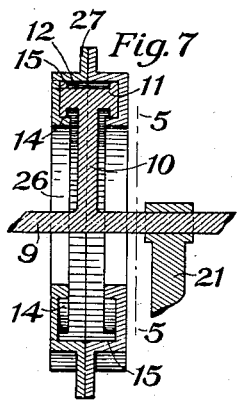
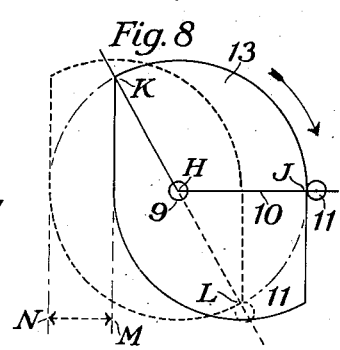
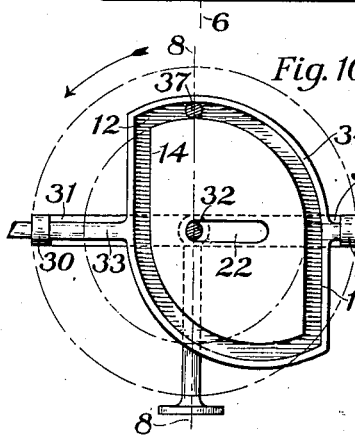
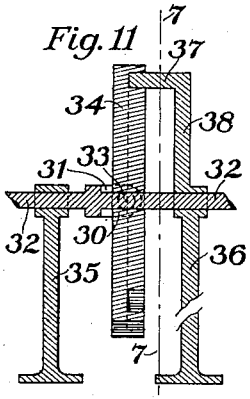
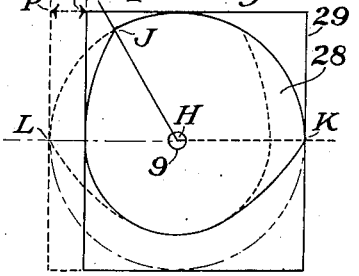
Max Friedland
Inventor Patented Mar. 5, 1935

1,993,135

UNITED STATES PATENT OFFICE 1,993,135

INVERSE CAM

Max Friedland, New York, N. Y.

Application February 27, 1934, Serial No. 713,078

9 Claims. (Cl. 74—50)

My invention relates to a new and useful inverse cam; and the objects of the invention are, first, to provide a cam for producing intermittent reciprocating motion from revolving motion; second, to provide a cam capable of producing long intervals of rest, short intervals of motion, with the length of travel of the follower greater than that obtained by a yoke cam having the same major radius; third to provide a cam suitable for use where compact construction is essential or desirable; and fourth, to provide means for imparting reciprocating motion to a revolving follower. An application and use of the cam in a reflex camera, is illustrated in my patent application Serial No. 659,742.

As shown in the accompanying drawing, Fig. 1 is a cross section view of the cam taken on line 1—1 of Fig. 2; Fig. 2, a cross section view taken on line 2—2 of Fig. 1; Fig. 3, a cross section view taken on line 3—3 of Fig. 4; Fig. 4, a cross section view taken on line 4—4 of Fig. 3; Fig. 5, a front view of the grooved portion of the follower; Fig. 6, a cross section view taken on line 5—5 of Fig. 7; Fig. 7, a cross section view taken on line 6—6 of Fig. 6; Fig. 8, a diagram showing the length of travel of the follower; Fig. 9, a diagram for comparative purposes showing the length of travel of a yoke cam; Fig. 10, a cross section view taken on line 7—7 of Fig. 11 showing the cam adapted for imparting reciprocating motion to a revolving follower; and Fig. 11, a cross section view taken on line 8—8 of Fig. 10.

In Fig. 1, the driving shaft 9 revolves in the direction of the arrow carrying crank 10 and pin 11, with the latter working in groove 12 of the follower 13. The sides 14 and 15 of groove 12 provide a continuous track for pin 11; and between points 16 and 17, and 18 and 19, constitute concentric guides. Between points 17 and 18, and 16 and 19, the sides 14 and 15 of groove 12, constitute parallel guides each tangent to one of the concentric guides. The concentric guides each coincide with the arc of a sector of a circle whose radial sides form a right angle. The follower 13 is constrained by stationary guides 20—20, so that the follower moves at right angles to the axis of shaft 9.

Fig. 2 shows the pin 11 between the sides 14 and 15 of groove 12. The shaft 9 revolves within the stationary support 21.

When the crank 10 of shaft 9 is parallel to the straight sides of the groove and begins to move carrying pin 11 within the curved sides of the groove 12, smooth intermittent reciprocating motion is imparted to follower 13, comprising in a cycle of 360 degrees of motion of crank 10, a stationary period of the follower during the first interval of 90 degrees; a period of motion of the follower during a second interval of 90 degrees; in the third interval of 90 degrees the follower is again stationary; and in the remaining interval of the cycle, the follower moves in a direction opposite to that of the second interval.

If crank 10 is revolved in an opposite direction, the intermittent reciprocating motion obtained will be the same, but the action will not be smooth.

As shown in Fig. 5, by adding the angle ABC to the right angle CBD of the follower 13a, the stationary period of follower 13 may be increased; thus also subtracting the angle GBF from the right angle GBD, decreasing the period of motion of follower 13.

Figs. 3 and 4 show a slot 22 in the follower 13 which permits the follower to move astride the shaft 9. Stationary guide 20a constrains the motion of follower 13.

As shown by the dotted lines in Fig. 5, auxiliary guides 24 and 25 may be added to the follower 13a, and an auxiliary pin 23 fastened to crank 10, to prevent pin 11 striking the points formed by the sides of slot 22 which cross the side 14 of groove 12.

Figs. 6 and 7, show an aperture 26 in follower 27 which permits the shaft 9, crank 10 and pin 11 to revolve within the follower. This construction gives better leverage to the action of pin 11 and crank 10.

Figs. 8 and 9 are diagrams showing the comparative lengths of reciprocating motion imparted to the follower by my inverse cam, as compared to that imparted by a yoke cam; each cam having the same interval of rest during the angle JHK, the same interval of motion during the angle JHL, and the same length of radius HJ. As shown by the dotted lines in Fig. 8, the follower 13 of the inverse cam moves a distance M—N, when pin 11 moves from J to L; whereas in Fig. 9, the yoke 29 moves only a distance R—P, when the cam 28 moves from J to L. To enable cam 28 to move yoke 29 a distance equal to M—N, its major radius J—H must be almost twice as long as the radius J—H of the inverse cam in Fig. 8. These diagrams clearly demonstrate the utility of my inverse cam as compared to a yoke cam, when compact constuction is essential. The position of stationary guide 20a in Figs. 3 and 4, aids in securing this compact construction.

Figs. 10 and 11 illustrate the application of the principle of my inverse cam for imparting reciprocating motion to a revolving follower. As shown, the guides 30—31 constrain the arms 33—33 of follower 34, and are fastened to and revolve with shaft 32, so that follower 34 must also revolve with shaft 32. The shaft 32 revolves also within the stationary supports 35 and 36. Support 36 has an extension 38 carrying a pin 37. Slot 22 permits the follower 34 to move astride the shaft 32 during the revolving motion of both the follower and shaft; and the sides 14 and 15 of groove 12 in combination with the stationary pin 37 and the revolving motion of shaft 32, impart intermittent reciprocating motion to the revolving follower 34.

The support 36, arm 38 and pin 37, instead of being held stationary, may be revolved if it be so desired, at speeds relative to the speed of shaft 32, and in the same direction as shaft 32, or in an opposing direction.

I am aware that inverse cams have been in use prior to my above invention and disclosure.

I claim:

1. In an inverse cam, a follower having two continuous tracks constituting a guide for the actuating means of the cam, a primary portion of each track being coincident to a portion of a curve, said curve being congruent to a curve described by the path of motion of said actuating means, a secondary portion of each track being tangent to a said primary portion, the actuating means being situated between the two tracks and being moved in a continuous path between the two tracks.

2. In combination, a guide, a follower constrained by said guide, means for imparting rotary motion to the guide and follower, the guide and follower being constantly perpendicular to the axis of said rotary motion, and means for imparting positive intermittent reciprocating motion to the revolving follower, the follower being moved by said reciprocating motion in directions perpendicular to the axis of the said rotary motion.

3. In an inverse cam, a follower having two continuous tracks constituting a guide for the actuating means of the cam, each track having two primary and two secondary portions, the primary portions each being coincident to a portion of a curve, said curve being congruent to a curve described by the path of motion of the actuating means, each secondary portion being tangent to a primary portion, one of the said tracks having each of its primary portions situated between two of its secondary portions, and the actuating means being situated between the two tracks and being moved in a continuous path between the two tracks.

4. In an inverse cam, a follower having two parallel guides each constituting substantially a continuous guiding track for the actuating means of the cam, the parallel portions of the two tracks being situated in a common plane, a primary portion of each track being coincident to a portion of the arc of a circle having the same radius as the actuating means, a secondary portion of each track being tangent to a said primary portion, the actuating means being situated between the two tracks, and being moved in a continuous path within the two tracks.

5. In an inverse cam, a follower having two parallel guides each constituting substantially a continuous guiding track for actuating means of the cam, said track comprising two curved portions and two straight portions, each curved portion being situated between the two straight portions, the curved portions each being coincident with a portion of the arc of a circle having the same radius as the actuating means, the straight portions being constantly perpendicular to the direction of motion of the follower during the motion of the follower, and the straight portions each being tangent to a curved portion of the track.

6. In combination, a driving shaft, a support for the shaft, a follower, a stationary guide constraining the motion of the follower, means fastened to the shaft for moving the follower, the follower having two parallel guides each constituting substantially a continuous track, said track comprising two curved portions and two straight portions, each curved portion being situated between the two straight portions, each of the curved portions being coincident with the arc of a sector of a circle whose radial sides include an angle greater than an acute angle and less than a straight angle, the straight portions of the track each being tangent to a curved portion and being perpendicular to the direction of motion of the follower, said means being situated between the two parallel guides, and the radius of said means being equal to the radius of said circle.

7. In an inverse cam, a follower having two parallel guides each constituting substantially a continuous guiding track for the actuating means of the cam, the parallel portions of the two guides being situated in a common plane, each guide comprising two primary and two secondary portions, each primary portion being situated between two secondary portions, each of the primary portions being coincident to a portion of the arc of a circle having the same radius as the actuating means, each of the secondary portions being tangent to a primary portion, and the actuating means being situated between the two guides.

8. In combination, a driving shaft, a support for the shaft, a guide fastened to and revolving with the shaft, a follower constrained by said guide, and means for imparting intermittent reciprocating motion to the follower, comprising a pin, a support for the pin, two parallel guides in the follower each constituting substantially a continuous track, the pin being situated between the two parallel guides, said track comprising two curved portions and two straight portions, the straight portions being perpendicular to the axis of the said reciprocating motion of the follower, each curved portion being situated between the two straight portions, the straight portions each being tangent to a curved portion, and the curved portions each being coincident to a portion of the arc of a circle having a radius equal to the distance between a bearing side of the pin and the axis of the driving shaft.

9. In an inverse cam, a follower having a guide for the actuating means of the cam, said guide having two tangent portions, the tangent portions being constantly situated during the motion of the follower on opposite sides of a plane, said plane extending through the axis of motion of the actuating means and being perpendicular to the axis of motion of the follower, the tangent portions being situated on opposite sides of a second plane the axis of motion of the follower and the axis of motion of the actuating means having extension in said second plane, each of the tangent portions being tangent during a portion of the motion of the follower to a curve described by the path of motion of the actuating means, the remaining portions of the guide constituting non-tangent portions, and the non-tangent portions being situated on opposite sides of the second and not being tangent during the motion of the follower to any portion of the said curve.

MAX FRIEDLAND.

CERTIFICATE OF CORRECTION.

Patent No. 1,993,135.  March 5, 1935.

MAX FRIEDLAND.

It is hereby certified that error appears in the printed specification of the above numbered patent requiring correction as follows: Page 1, second column, line 45, for "constuction" read construction; page 2, first column, line 61, claim 5, after "for" insert the word the; same page, second column, line 61, claim 9, after "plane" insert a comma; and line 70, after the syllable "ond" insert the word plane; and that the said Letters Patent should be read with these corrections therein that the same may conform to the record of the case in the Patent Office.

Signed and sealed this 9th day of April, A. D. 1935.

(Seal)

Leslie Frazer
Acting Commissioner of Patents.